(No Model.)

W. L. RUCKER.
CORN PLANTER.

No. 310,543. Patented Jan. 6, 1885.

WITNESSES:

INVENTOR:
W. L. Rucker
BY Munn & Co
ATTORNEYS.

UNITED STATES PATENT OFFICE.

WILLIAM L. RUCKER, OF MARTINSVILLE, MISSOURI.

CORN-PLANTER.

SPECIFICATION forming part of Letters Patent No. 310,543, dated January 6, 1885.

Application filed August 11, 1884. (No model.)

*To all whom it may concern:*

Be it known that I, WILLIAM L. RUCKER, of Martinsville, in the county of Harrison and State of Missouri, have invented a new and Improved Corn-Planter, of which the following is a full, clear, and exact description.

The object of my invention is to provide an efficient corn-planter the mechanism of which may easily be controlled by the driver from his seat for allowing or preventing the dropping of seed, and for setting the dropping-mechanism at the commencement of the planting of the rows to insure the planting of the seed in accurate check-row, the machine being adapted also for planting in drills.

The invention consists of the several combinations of parts, substantially as hereinafter described and claimed.

Reference is to be had to the accompanying drawings, forming part of this specification, in which similar letters of reference indicate corresponding parts in all the figures.

Figure 1:
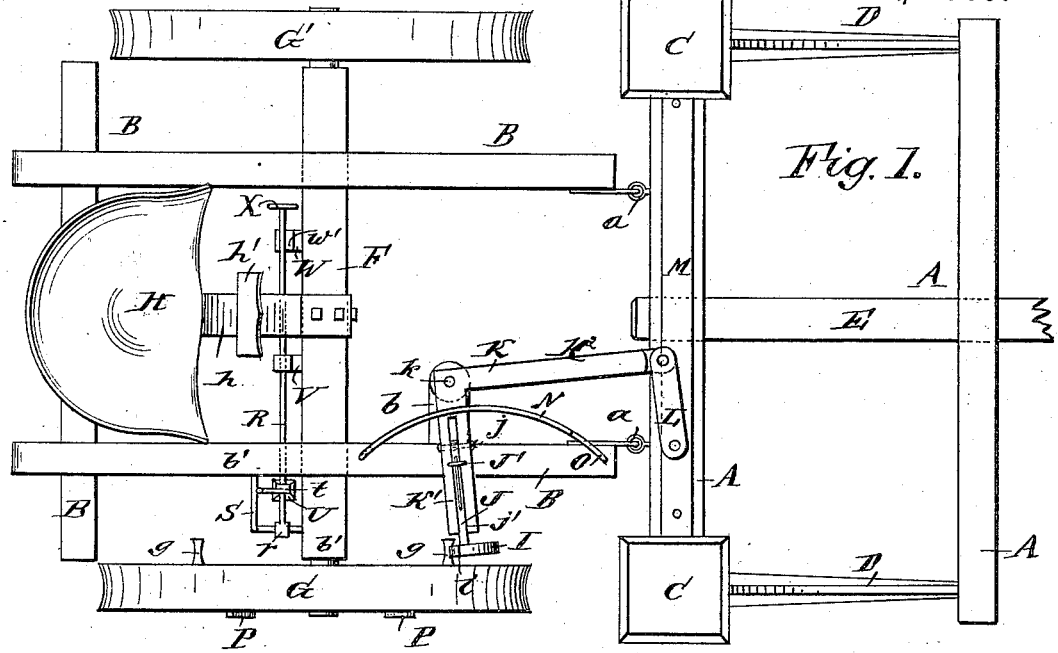
Figure 2:
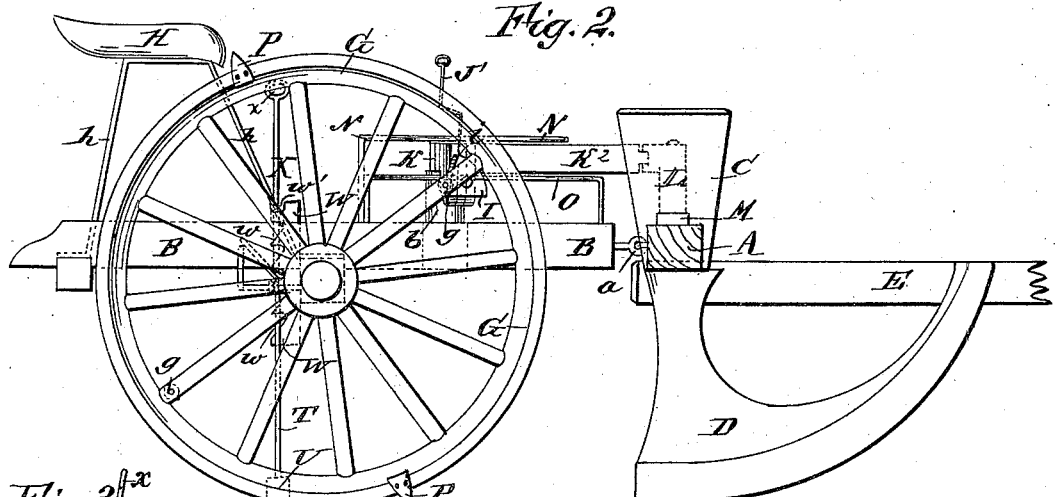
Figure 3:
Figure 4:
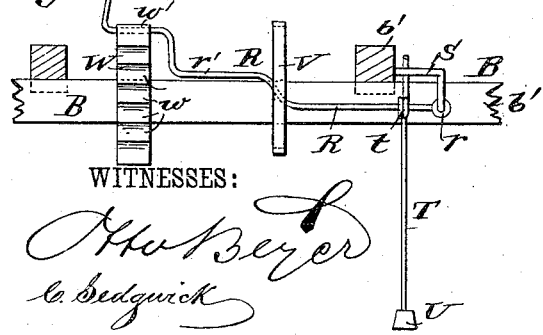

Figure 1 is a plan view of my improved corn-planter. Fig. 2 is a side elevation of the same. Fig. 3 is a rear view of the drop-wheel-lifting mechanism, with parts of the planter-frame in section, and Fig. 4 is a detail sectional elevation of the back end of the drop-lever and its pivoted tappet-head.

The planter has the usual front frame, A, to support the seed-boxes C C and runners D D, and provide a fastening for the tongue E, and a rear frame, B, which has a loose or pivotal connection at $a$ $a$ with the frame A, and is supported on an axle, F, and wheels G G', and carries the driver's seat H, which may have any suitable construction and be attached by spring-standards $h$ $h$ to the frame, and a foot-board, $h'$, may be fixed to one of the standards, as shown. The wheel G actuates the dropping mechanism by means of opposite tappets or pins, $g$ $g$, which project from its inner side, one of which tappets is nearer the circumference of the wheel than the other, so that one of the tappets strikes the inner curved face of the head I, and the other tappet strikes the outer face of the head. The head I is fixed at the end of an arm, J, which is pivoted at $j$ in a slot, $j'$, made in the arm K' of the drop-lever K, which lever is pivoted at $k$ to the frame B, or to an arm or bracket, $b$, fixed to the frame, and the other or longer arm, K², of lever K reaches forward to connect pivotally by a link, L, with the dropping slide M, which lies on the frame A and enters the seed-boxes C C, which, with the slide may have any suitable seed-dropping apertures to deliver the seed to the ground through the runners D D in larger or smaller quantities for each stroke of the slide, as may be required. The joint-connections of the link L, with the drop-lever K and dropping slide M, allow free action of the parts and leave the forward frame, A, at liberty to move up or down on the connections $a$ $a$ with the rear frame, B, as the machine moves over inequalities of the ground. The head I of the drop-lever K may be made of a solid block, or of a bent metal rod having an apex or point, $i$, at opposite sides of which the tappets $g$ $g$ strike the head, so that one tappet will, by acting on one side of the head, shift the lever K and slide M one way, and the next tappet, by acting on the other side of the head, will shift the lever K and slide M in the opposite direction, for dropping the seed from both boxes either once or twice, according to the arrangement of the dropping-apertures, for each revolution of the wheel G, the preferred arrangement dropping the seed twice for each revolution. The arm J of the head I fits the slot $j'$ snugly, and as the action of the tappets $g$ on the head I is in a downward direction the head will keep its position for dropping the seed without attention from the driver, and when he wishes to stop the dropping of seed, as when traveling to and from the field, or when turning around in the field, all that is necessary is to swing the arm J over on its pivot $j$, as indicated partly in dotted lines in Fig. 4, which will throw the head I upward and backward out of the paths of the tappets $g$, and prevent movement of the dropping-slide, as will readily be understood. To allow the arm J and its head I to be thrown back more conveniently by the driver, I fasten a handle arm, J', to the arm J, and the arm J' preferably is bent to the form shown in Fig. 4, so that the driver may throw the head I either up or down by his hand or foot, and without leaving his seat. I attach bars N O to the frame B, said bars ranging horizontally above and below the arm K' of the drop-lever as a support and guide to said lever.

The letters P P indicate markers consisting of any suitable pointed plates, which are fixed to the drop-wheel G, so as to mark the ground where the seed falls.

It is necessary in starting the machine for planting each row to set the guide-wheel so that the markers shall coincide with the marks of the row last planted, to insure the planting of the field in accurate check-row, and, to allow the wheel G to be more easily set for this purpose, I have arranged mechanism whereby the wheel may be lifted from the ground for turning it.

The wheel-lifting mechanism consists of a lever, R, which is fulcrumed by an eye, r, or other suitable joint-connection to the frame B, or to an angle-bar, S, fixed to the frame timbers or parts b' b', on which lever, near its fulcrum, is placed by an eye, t, or other suitable connection, the standard T, which carries a foot-block, U. After passing loosely through or within a keeper or guide, V, fixed to the frame, the lever R extends sidewise past the rack-bar W, and then is bent upward to form a handle, X, with a cross head or loop, x, by which to grasp it firmly for lowering that end of the lever to bring the foot-block U to the ground, and by continued pressure to lift one side of the frame and the wheel G. A depression or bend in the lever R at r' makes a rest for the foot of the driver so that without leaving his seat he may operate the lever R with either hand or foot, or both, to lift the wheel G from the ground, which being done, he can reach the wheel easily for turning or setting it accurately for starting the dropping mechanism at the proper time.

To hold the frame and wheel G raised while the driver is setting the wheel, the lever R will be set into one of the downwardly-raking teeth w of the rack-bar W, and when the wheel is set and again lowered to the ground the lever R may be raised and placed in a notch, w', on the top of the rack-bar W, for holding the foot-block U clear of the ground while the planting proceeds, or while the machine is on the road.

It will be seen that all the necessary adjustments of the mechanism may be made by the driver without requiring him to leave his seat, thus adding to his comfort and saving time in the work.

Any number of successive pairs of tappets g may be fixed to the drop-wheel G, so as to operate the dropping-slide slower or faster, according as it is desired to plant the seed closer together or in drills, or farther apart in hills, and the machine may be used for planting any kind of seed set in hills or drills, as will readily be understood.

Having thus described my invention, what I claim as new, and desire to secure by Letters Patent, is—

1. In a corn-planter, the combination, with the drop-slide-actuating lever, of the arm having the head acted upon by the wheel-tappets, said arm being pivoted in a longitudinal slot of the slide-actuating lever, substantially as and for the purpose set forth.

2. In a corn-planter, the combination, with the slide-actuating lever, of the head acted upon by the wheel-tappets, said arm being pivoted to said lever and having a right-angled handle to permit its operation, substantially as and for the purpose set forth.

3. In a corn-planter, the combination, with the dropping-slide, of the right-angled lever linked or toggle-jointed to the said slide and pivoted at its elbow to the frame of the machine, said right-angled lever having a pivoted arm resting thereon and carrying a head actuated by the wheel-tappets, substantially as shown and described, and for the purpose set forth.

4. In a corn-planter, the combination, with the slide-actuating lever carrying the head actuated by the wheel-tappets, of the guide N O, arranged one above and the other below said lever, substantially as and for the purpose set forth.

5. In a corn-planter, the combination, with the axle, one of whose wheels carries the slide-actuating tappets, of the cranked rod or lever guided within a keeper affixed to the axle, said rod or lever carrying a pendent arm and pivotally connected to the axle, and the rack with its upper end provided with a holding-notch, substantially as and for the purpose set forth.

WILLIAM L. RUCKER.

Witnesses:
I. N. WREN,
CHAS. A. JUDES.